(12) United States Patent
Ette (10) Patent No.: US 9,956,940 B2
(45) Date of Patent: May 1, 2018

(54) METHOD AND DEVICE FOR ACTUATING A CLOSING ELEMENT FOR A VEHICLE

(71) Applicant: VOLKSWAGEN AG, Wolfsburg (DE)

(72) Inventor: Bernd Ette, Wolfsburg (DE)

(73) Assignee: Volkswagen AG (DE)

( * ) Notice: Subject to any disclaimer, the term of this patent is extended or adjusted under 35 U.S.C. 154(b) by 0 days. days.

(21) Appl. No.: 15/122,651

(22) PCT Filed: Feb. 27, 2015

(86) PCT No.: PCT/EP2015/054140
§ 371 (c)(1),
(2) Date: Aug. 31, 2016

(87) PCT Pub. No.: WO2015/139932
PCT Pub. Date: Sep. 24, 2015

(65) Prior Publication Data
US 2017/0066407 A1    Mar. 9, 2017

(30) Foreign Application Priority Data

Mar. 17, 2014    (DE) .......................... 10 2014 204 914

(51) Int. Cl.
*B60R 25/20*    (2013.01)
*B60R 25/24*    (2013.01)
(Continued)

(52) U.S. Cl.
CPC .......... *B60R 25/20* (2013.01); *B60R 25/2045* (2013.01); *B60R 25/2054* (2013.01);
(Continued)

(58) Field of Classification Search
CPC ..................................................... B60R 25/20
See application file for complete search history.

(56) References Cited

U.S. PATENT DOCUMENTS 6,542,071 B1 * 4/2003 Ohtsubo ............. B60R 25/2036
340/10.1
6,924,735 B2 * 8/2005 Ueda ....................... E05B 77/48
307/10.1
(Continued)

FOREIGN PATENT DOCUMENTS

CN    101519935 A    9/2009
CN    102458934 A    5/2012
(Continued)

OTHER PUBLICATIONS

Search Report for German Patent Application No. 10 2014 204 914.8; dated Nov. 18, 2014.
(Continued)

*Primary Examiner* — Alex C Dunn
(74) *Attorney, Agent, or Firm* — Barnes & Thornburg LLP (57) ABSTRACT

A method for actuating a closing element of a vehicle including optically detecting when an object approaches a point in an area; searching for a smart key which is authorized for the vehicle only if an approach of an object has already been detected; activating additional sensors only when the smart key is found; collecting information by the additional sensor; and actuating the closure element if the collected information meets at least one predetermined requirement.

25 Claims, 4 Drawing Sheets

(51) Int. Cl.
*B60R 25/25* (2013.01)
*G06K 9/46* (2006.01)

(52) U.S. Cl.
CPC ............ *B60R 25/24* (2013.01); *B60R 25/257* (2013.01); *G06K 9/4671* (2013.01)

(56) References Cited

U.S. PATENT DOCUMENTS

| | | | | |
|---|---|---|---|---|
| 7,005,960 | B2* | 2/2006 | Flick | B60R 25/24 340/5.22 |
| 7,916,021 | B2* | 3/2011 | Lickfelt | B60R 25/245 340/426.13 |
| 7,999,654 | B2* | 8/2011 | Taki | B60R 25/2009 307/10.3 |
| 9,721,408 | B2* | 8/2017 | Obata | G07C 9/00126 |
| 2005/0099263 | A1* | 5/2005 | Ikeda | B60R 25/24 340/5.62 |
| 2006/0044800 | A1* | 3/2006 | Reime | H05B 33/0803 362/276 |
| 2006/0152351 | A1* | 7/2006 | Daura Luna | B60Q 9/005 340/435 |
| 2006/0204037 | A1* | 9/2006 | Watanabe | G06K 9/00805 382/104 |
| 2007/0146120 | A1 | 6/2007 | Kachouh | |
| 2008/0278576 | A1* | 11/2008 | Nishigaki | G06T 7/246 348/94 |
| 2009/0309714 | A1 | 12/2009 | Baruco et al. | |
| 2013/0226399 | A1* | 8/2013 | Miller | B60R 25/20 701/36 |
| 2014/0129053 | A1* | 5/2014 | Kleve | B60R 25/24 701/2 |
| 2014/0291480 | A1* | 10/2014 | Bruder | G01C 3/06 250/206 |
| 2014/0324298 | A1* | 10/2014 | Reime | G01V 8/20 701/49 |
| 2016/0247403 | A1* | 8/2016 | Krauss | B60R 25/2054 |

FOREIGN PATENT DOCUMENTS

| | | |
|---|---|---|
| DE | 102005032402 B3 | 9/2006 |
| DE | 102006018326 A1 | 10/2006 |
| DE | 202005020140 U1 | 5/2007 |
| DE | 102007006252 A1 | 8/2008 |
| DE | 102008025669 A1 | 12/2008 |
| DE | 102007035513 A1 | 2/2009 |
| DE | 102009023594 A1 | 12/2010 |
| DE | 102009040395 A1 | 4/2011 |
| DE | 202010017197 U1 | 8/2011 |
| DE | 102011051434 A1 | 1/2013 |
| EP | 1235190 A1 | 8/2002 |
| EP | 2860704 A1 | 4/2015 |
| EP | 2860718 A1 | 4/2015 |
| FR | 2979873 A1 | 3/2013 |
| WO | 2007006514 A1 | 1/2007 |

OTHER PUBLICATIONS

Search Report for International Patent Application No. PCT/EP2015/054140; dated May 26, 2015.

* cited by examiner

METHOD AND DEVICE FOR ACTUATING A CLOSING ELEMENT FOR A VEHICLE

PRIORITY CLAIM

This patent application is a U.S. National Phase of International Patent Application No. PCT/EP2015/054140, filed 27 Feb. 2015, which claims priority to German Patent Application No. 10 2014 204 914.8, filed 17 Mar. 2014, the disclosures of which are incorporated herein by reference in their entirety.

SUMMARY

Illustrative embodiments provide a method and a device for contactlessly actuating a closing element (i.e., a tailgate) of a vehicle.

BRIEF DESCRIPTION OF THE DRAWINGS

Disclosed embodiments are described in detail below with reference to the figures.

DETAILED DESCRIPTION OF THE DISCLOSED EMBODIMENTS

DE 10 2009 023 594 A1 discloses the actuation of a closing element of a vehicle. In this case, the closing element is actuated if a predetermined displacement of an object in the surroundings of the vehicle and a vehicle key associated with the vehicle are detected at the same time. An optical sensor is then only actuated if a capacitive sensor has already detected a part of a predetermined displacement profile.

DE 10 2011 051 434 A1 discloses a capacitive sensor arrangement for the detection of approaches and gesture movements of a user at a motor vehicle. In this case, electrodes that are in the reduced energy mode are roused if other electrodes register a possible actuation.

DE 10 2009 040 395 A1 discloses the control of a door of a vehicle. In this case, the door is unlocked and/or opened if a predetermined displacement pattern of an object is recognized. In this case the displacement pattern comprises a displacement in at least two successive different directions relative to the vehicle and dwelling at a position for a predetermined period of time.

The contactless actuation of a closing element of a vehicle according to the state of the art has high energy consumption, because for one thing a search is continuously made for a radio key that is authorized for the vehicle, and because for another thing the sensor means with which a suitable gesture for the actuation of the closing element is detected has high energy consumption.

Disclosed embodiments reduce the energy consumption for the contactless actuation of a closing element of a vehicle compared to the state of the art.

Disclosed embodiments provide a method for the actuation of a closing element of a vehicle and a device for the actuation of a closing element of a vehicle.

Within the scope of the disclosed embodiments, a method for the actuation of a closing element of a vehicle is provided, which comprises the following operations:

With optical sensor means, an approach of an object to a position within a region (for example, the detection region of the optical sensor means) is detected.

Only if the approach of the object to the position has been previously detected is a radio key that is authorized for the vehicle searched for.

Only if the radio key has been found (which also implies that the approach of the object has been detected correctly) are further sensor means activated.

Information is detected by means of the further sensor means.

The closing element is only actuated if the previously detected information meets one or a plurality of defined conditions.

As the energy-intensive search for the authorized radio key and also the activation of the further sensor means only take place if the approach of the object to the position has been previously successfully detected, in the normal case (i.e., there is no approach) only a little energy is required for the optical sensor means for the detection of the approach. Owing to the use of optical sensor means to detect the approach, the region can adopt significantly larger dimensions than is the case with the use of other sensor means (for example, capacitive sensors). In this case, for example, the region spans a region of a minimum distance of 0.4 m to a distance of 2 m from the vehicle in each case.

The closing element for this can be a flap, a door, a window or a sliding roof of the vehicle.

In this case, the approach of the object to the position comprises a directed displacement of the object towards the optical sensor means.

In other words, the approach of the object is only then detected as such if the object is displaced towards the optical sensor means, such as a directed displacement. That is, the direction of the approach must essentially be directed towards the optical sensor means to be detected as an approach. Owing to the more accurate definition of the approach of the object, for example, a displacement of an object that is passing by the vehicle is not considered to be an approach. Therefore, pedestrians or vehicles passing by the vehicle do not cause a (fruitless) search for the radio key or the activation of the further sensor means.

There are the following versions of the further sensor means:

The further sensor means can, for example, comprise an audio amplifier and/or a microphone, so that the detection of the information can comprise speech recognition. As a result, for example, the driver of the vehicle can actuate the closing element by a suitable voice command.

The further sensor means can comprise further optical sensor means (for example, a reversing camera), to detect therewith the displacement profile or the gesture to be carried out.

The further sensor means can comprise the optical sensor means itself, so that, for example, only the optical sensor means can be present to perform the disclosed method. In this case, the optical sensor means are only partially activated to detect the approach of the object to a position in the detection region at any time. Only if the approach of the object has been positively detected and if in addition the radio key has been found are the optical sensor means fully activated. The partial activation of the optical sensor means can also be considered to be a passive operating mode and the full activation as an active operating mode of the optical sensor means.

The detection of the approach and hence the detection of the displacement profile can comprise the detection of the object dwelling at the position for a predetermined time interval. In other words, the approach is only then detected as such and the displacement profile only then meets the at least one condition if the object is at a standstill for at least a predetermined period of time (for example, 0.4 s).

So that the displacement profile meets the conditions, it can moreover also be necessary that the object is at a standstill at the position for no longer than a predetermined further period of time (for example, 3 s). In other words, an object that remains at the position for longer than the further period of time causes termination of the disclosed method, so that the closing element is not actuated.

According to a disclosed embodiment, ambient influences (for example, rain) can be detected during the detection of the approach. The ambient influences can then be taken into account during the detection of the information using the further sensor means or by the analysis logic for the displacement profile or the gesture.

The disclosed embodiment ensures that ambient influences that are detected during the approach can be taken into account immediately by the further sensor means, without the further sensor means themselves having to detect the ambient influences.

With the optical sensor means a displacement profile (gesture) of the object is detected that comprises the approach of the object and the detected information. Only if the displacement profile meets a certain condition or certain conditions is the closing element actuated (i.e., opened or closed).

If the gesture or the displacement profile is detected with fully activated sensor means, the gesture or the displacement profile can be detected very accurately, which almost excludes errors in the analysis of whether the displacement profile meets the at least one condition.

The activation of the further sensor means can in addition comprise the generation of a visual marker for localizing the position. In this case, the generation of the visual marker can comprise switching on perimeter lighting of the vehicle.

The visual marker is used in this case not only for localizing the position, but also as an indication that a first part of the displacement profile, which is to be implemented correctly for the actuation of the closing element, has been detected. The generation of the visual marker is therefore also a type of feedback for the fact that the disclosed method is ready for the detection of the (remaining) displacement profile or a gesture.

According to a further disclosed embodiment, the optical sensor means comprises a plurality of pixels that are arranged as a matrix (for example, 30 pixels*30 pixels). In this case, different pixels of the optical sensor means can be activated successively against time to decide, using the analysis of the signals detected by the activated pixels, whether there is an approach of the object to the position or not. In this case, a pixel is understood to mean a photosensitive component.

With this disclosed embodiment, the partial activation of the optical sensor means comprises the activation of different pixels of the matrix successively against time. If, for example, at a point in time only the pixels of one of the 30 columns or only some of the pixels of one of the 30 columns are activated, it is important that energy can be saved in comparison to the activation of all pixels of the matrix.

Each pixel of the matrix corresponds to a certain area of the detection region in which the approach of the object can be detected by the optical sensor means. In this case, the detection region can be adjusted by a corresponding lens of the sensor means. In this case, the optical sensor means are attached to the vehicle so that the pixels of a certain row at the edge of the matrix correspond to the boundary of the detection region that is at the shortest distance from the vehicle. In this case, left columns of the matrix correspond to a left side region of the detection region and right columns of the matrix correspond to a right side region of the detection region. A person that is passing by the vehicle from left to right is first detected by the pixels of the left column of the matrix and is then detected by the pixels of the right column of the matrix. For the detection of the approach, the pixels of the right columns of the matrix can be activated and analyzed successively against time. In this case, the pixels are activated and analyzed by column from right to left. This is commenced with the pixels of the farthest right lying column, wherein the pixels of the further right bounding column are activated and analyzed and then the pixels of the next further right bounding column are activated and analyzed etc., until the pixels of a column in the central region (for example, the pixels of column 15 in a matrix of 30 columns) have been activated and analyzed. In a similar manner, the pixels can be activated and analyzed by column from left to right. In this case, this is commenced with the pixels of the furthest left lying column, wherein the pixels of the further left bounding column are then activated and analyzed and then the pixels of the next further left bounding column are activated and analyzed etc. until the pixels of a column in the central region (for example, the pixels of column 16 in a matrix of 30 columns) have been activated and analyzed.

In this way, a person approaching the optical sensor means or the vehicle from the right or left can be detected.

The pixels of the right columns and the pixels of the left columns can be activated and analyzed alternately for this, for example, so that first all pixels of the right (left) columns are activated and analyzed successively against time and then all pixels of the left (right) columns are activated and analyzed successively against time, for example.

With a matrix with 30 columns, for example, within a predetermined time interval (for example, 200 ms) the pixels of columns 1 through 15 (i.e., the pixels of columns 1, 2, 3 etc.) can be activated and analyzed successively. Then during the next predetermined time interval, the pixels of columns 30 through 16 (i.e., the pixels of columns 30, 29, 28 etc.) are successively activated and analyzed. In other words, at a certain point in time only pixels of one column are activated.

To decide whether there is an approach of the object to the position, a centroid of an area can be calculated starting from all pixels that are currently detecting the object. In addition, each pixel that detects the object can be weighted using the corresponding pixel value (for example, a measure of the probability that the pixel has detected an object). The displacement against time of the centroid of the area is analyzed. If the centroid of the area moves to the position and dwells at the position for the predetermined time interval, it is positively decided that the object has approached.

By the analysis of the activated pixels and by the analysis of the centroid of the area, the following processes or situations can be distinguished from each other:

The object is approaching the position or the optical sensor means.

The object is remaining at a standstill.

The object is moving past the vehicle.

By the analysis of the activated pixels, therefore different processes or situations can be distinguished from each other. As a result, it is possible to quasi-filter out certain situations, such as, for example, an object passing by the vehicle or an object remaining at a standstill, so that in the situations neither does a radio key have to be searched for nor does the further sensor means have to be activated.

To improve the sensitivity and/or to increase the detection region, for detecting an approach, groups of adjacent pixels can also be combined, wherein a group can then effectively be considered as an enlarged pixel.

The displacement profile comprises a foot gesture, wherein the displacement profile could also comprise a hand gesture. The object can be a whole person, but also only a certain body part of a person (for example, only the foot or only the toe of the foot).

A device for the actuation of a closing element of a vehicle is provided. In this case, the device comprises a controller, a radio antenna, optical sensor means and further sensor means. The optical sensor means are configured to detect an approach of an object towards a position in a detection region of the optical sensor means. The radio antenna and the controller are configured to only then search for a radio key that is authorized for the vehicle if the approach has previously been detected. Moreover, the controller is configured to activate the further sensor means only if the radio key has previously been found. The further sensor means and the controller are configured to detect information. Finally, the device is configured to actuate the closing element if the controller has determined that the detected information meets at least one predetermined condition.

The benefits of the disclosed device correspond essentially to the benefits of the disclosed method, which have been described in detail above, so that the repetition thereof is omitted here.

The optical sensor means comprise a plurality of pixels that are disposed as a two-dimensional matrix.

As a result, the disclosed device can be disposed on a vehicle so that pixels of the matrix each forming a row of the matrix are disposed horizontally relative to the vehicle, and pixels of the matrix each forming a column of the matrix are disposed vertically relative to the vehicle.

Disclosed embodiments also comprise a device that is configured to perform one of the previously described versions of the disclosed method.

Finally, the disclosed embodiments also comprise a vehicle that, besides a closing element, comprises a disclosed device.

Possible installation locations of the optical sensor means are the license plate lighting in a tailgate, a rear outer corner, the B pillar of the vehicle or in the middle of the rear of the vehicle.

Disclosed embodiments are suitable for the actuation of a closing element of a vehicle. Of course, the disclosed embodiments are not limited to the application area, because the disclosed embodiments can also be used for ships and aircraft as well as for rail vehicles or track-guided vehicles. Moreover, it is also conceivable to use the disclosed embodiments for the actuation of a closing element of a stationary object (for example, of a house).

Figure 1:
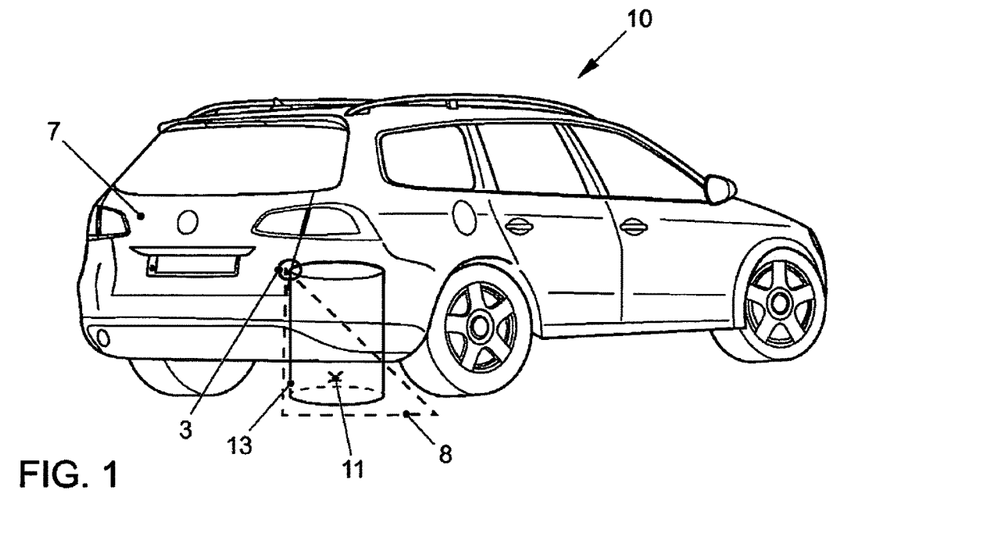
FIG. 1 shows disclosed embodiments using the actuation of a tailgate of a vehicle.

In FIG. 1 a vehicle 10 with a tailgate 7 is represented. On the right rear corner of the vehicle at the height of the bumper there is an optical sensor 3 that detects displacements in a detection region 8 of the sensor 3. An action region 13, in which the gesture for the actuation of the tailgate 7 is to be detected following a successfully detected approach and key search, is denoted with the reference character 13. For a positively detected approach, the operator must approach the position 11 or the optical sensor 3. In the case of a successful approach, the position 11 is marked to encourage the operator to carry out the gesture for the actuation of the tailgate 7 at the position 11 or at least in the action region 13.

Figure 2:
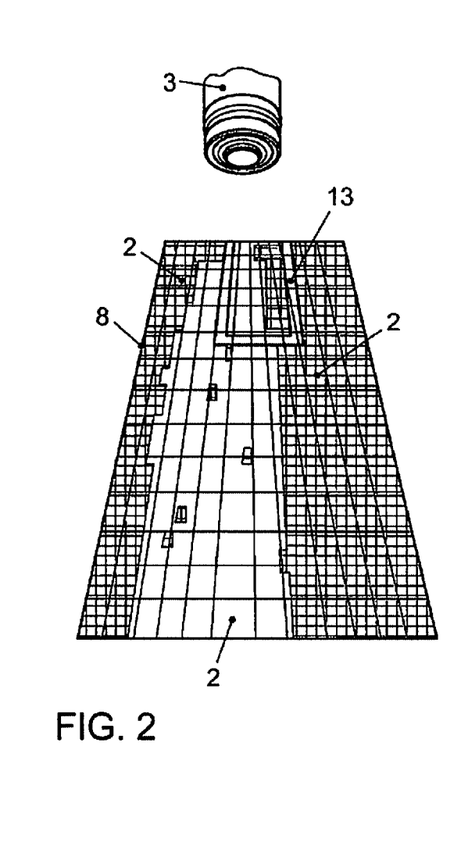
FIG. 2 schematically shows the detection region of an optical sensor during the approach of an object.
Figure 3:
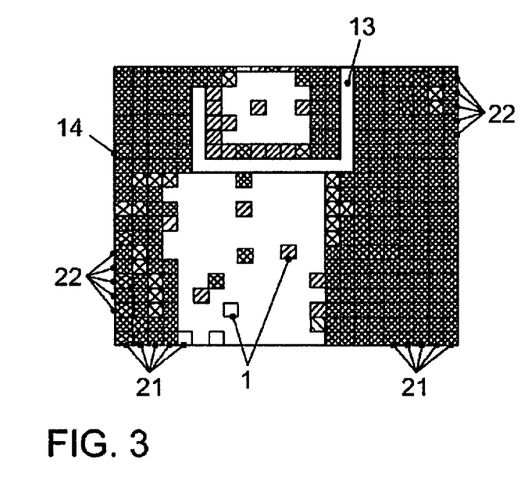
FIG. 3 shows the pixel matrix of an optical sensor during the approach of an object.
Figure 4:
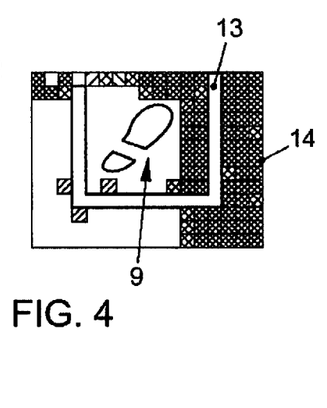
FIG. 4 shows the action region within the pixel matrix.

As described in detail using FIGS. 2 through 4, the optical sensor 3 comprises a plurality of pixels 1 that are disposed as a matrix 14. For detecting an approach or recognizing an approach, the optical sensor 3 is only partially activated, which means that only some pixels 1 of the optical sensor 3 are energized per time interval. In this case, the detection of an approach can be carried out in the detection region 8, whereas the gesture recognition (i.e., the check of whether a displacement profile of the object that is detected by the optical sensor 3 corresponds to the predetermined conditions) is essentially carried out in the action region 13.

In FIG. 2 the optical sensor 3 is represented together with a detection region 8. The detection region 8 corresponds to the region or the area in the surroundings of the vehicle that is monitored by the optical sensor 3. Each area segment 2 in the detection region 8 corresponds to a pixel 1 of the matrix 14 of the optical sensor 3. The horizontal row of the area segment 2 that is disposed closest to the optical sensor 3 in FIG. 2 corresponds to the pixels 1 of a row 22 of the matrix 14 that is disposed at the upper edge of the matrix 14 in FIG. 3. Therefore, the columns 21 of the matrix 14 at the right or left edge of the matrix 14 correspond to the area segments 2 at the right or left edge of the detection region 8. A person moving past the vehicle from left to right across the detection region 8 is therefore first detected by the pixels 1 of the left columns 21 of the matrix 14 and is then detected by the pixels 1 of the right columns 21 of the matrix 14.

An action region or foot recognition region in which a foot gesture for the actuation of a closing element (for example, the tailgate 7) of the vehicle 10 is to be performed is denoted with the reference character 13.

In FIG. 3 the pixels 1 of the optical sensor 3 are represented as the matrix 14. The segment of the matrix 14 that is represented in FIG. 3 that comprises the action region 14 is represented in detail in FIG. 4. Following a successful approach and following a successful key search, the action region 13 is marked with a round laser spot at the position 11 (see FIG. 1), to signal to the operator for one thing that the approach and the key search were successful and to show the operator for another thing that he must place his foot 9 in the action region 13 for the actuation of the closing element 7 (if possible at the position 11).

Once the approach and the key search are successfully detected, all 30*30 pixels of the optical sensor 3 are activated to detect the gesture that is necessary for the actuation of the closing element (in this case a foot gesture). With the disclosed embodiment represented with FIGS. 2-4, a check is made with the fully activated optical sensor 3 as to whether the operator places his foot close to the position 11 within the action region 13 and withdraws it again. Only if the displacement of the forward movement of the foot 9 corresponds to the displacement of the retraction of the foot during this (for example, the directions of the two displacements should essentially be antiparallel), is the closing element actuated.

Figure 5:
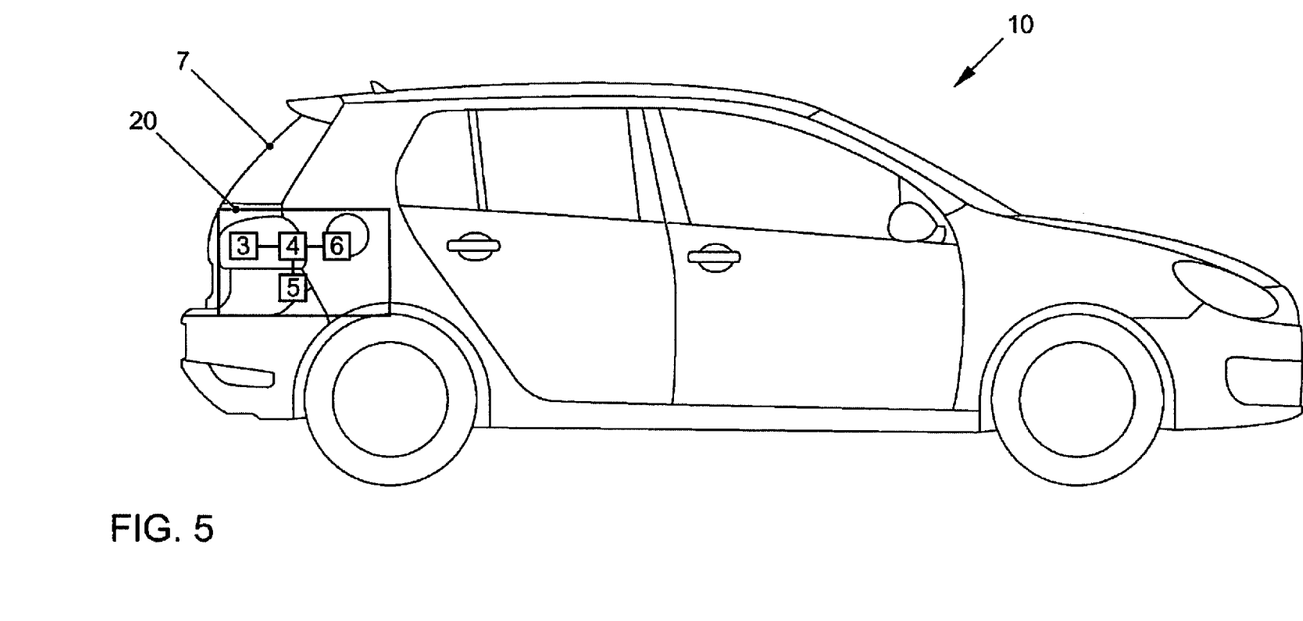
FIG. 5 schematically shows a vehicle with a disclosed device.

In FIG. 5 a vehicle 10 with a device 20 for the actuation of a tailgate 7 of the vehicle 10 is represented schematically.

For its part, the device 20 comprises a controller 4, the optical sensor 3, a radio antenna 5 and a laser 6. Whereas a radio key that is authorized for the vehicle 10 can be detected with the radio antenna 5, the laser 6 is configured to produce a visual marker for localizing the position 11 in the detection region 8 of the optical sensor 3 (more accurately, in the action region 13). The detection region 8 for detecting an approach and the action region 13 for gesture recognition can each be implemented for this by a suitable lens of the sensor means 3.

Figure 6:
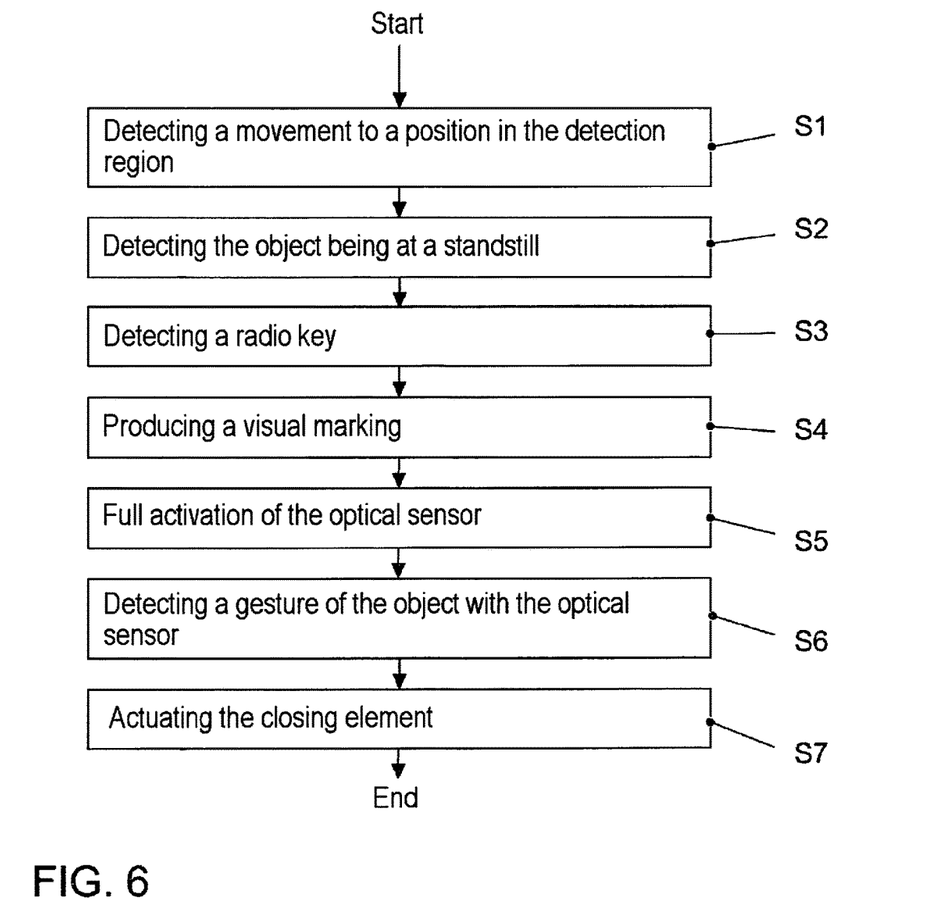
FIG. 6 shows a flow chart of a disclosed method.

In FIG. 6 a flow chart of a disclosed method for the actuation of a closing element 7 of a vehicle 10 is represented.

In the first operation at S1, the displacement of an object towards a position 11 in the detection region 8 of the optical sensor 3, i.e., an approach by the object, is detected. Only if the displacement directed towards the optical sensor 3 is detected in the first operation at S1 is a check made in the following operation at S2 as to whether the object remains close to the position at least for a predetermined period of time (for example, 0.4 s). Only if the displacement directed towards the optical sensor 3 and the standstill of the object have been detected in operation at S1 and S2 is a radio key that is authorized for the vehicle searched for in the region of the optical sensor 3 in operation at S3.

Only if the radio key that is authorized for the vehicle has been found in operation at S3 is a visual marker produced at the position 11 in the following operation at S4 and is the optical sensor 3 fully activated in operation at S5. The visual marker signals to the user that the approach has been correctly detected and that the optical sensor is fully activated (i.e., all pixels of the sensor 3 are working and are able to detect the object) to detect the subsequent displacement profile of the object.

The detection of the gesture or of the displacement profile of the object is performed in operation at S6 with the optical sensor 3. If the displacement profile meets the predetermined conditions, the closing element is actuated in operation at S7.

REFERENCE CHARACTER LIST 1 pixel
2 segment of area
3 optical sensor
4 controller
5 radio antenna
6 laser
7 tailgate
8 detection region
9 foot
10 vehicle
11 position
13 action region
14 matrix
20 device
21 column of the matrix
22 row of the matrix
S1-S7 operation of the method

The invention claimed is:

1. A method for the actuation of a closing element of a vehicle, the method comprising:
optically detecting an approach of an object to a position in a region using a sensor module, wherein the sensor module includes an optical sensor that is only partially activated for the detection of the approach;
searching for a radio key that is authorized for the vehicle only in response to the approach having been previously detected by the optical sensor;
activating a further sensor of the sensor module only in response to the radio key having been found;
detecting information by the activated further sensor; and
actuating the closing element in response to the detected information meeting at least one predetermined condition.

2. The method of claim 1, wherein the detection of the approach of the object towards the position by the optical sensor comprises optical detection of a directed displacement of the object towards the optical sensor.

3. The method of claim 1, wherein the detection of the information by the further sensor of the sensor module comprises voice recognition performed using audio amplifier and/or a microphone.

4. The method of claim 1, wherein the detection of the approach comprises detection of the object dwelling at the position in the region for a predetermined time interval.

5. The method of claim 1, wherein the detection of the approach comprises the detection of ambient influences, wherein the ambient influences are taken into account during the subsequent detection of the information by the further sensor of the sensor module.

6. The method of claim 1, wherein the further sensor in the sensor module comprises a further optical sensor, and wherein the activation of the optical sensor of the further sensor is performed in combination with full activation of the optical sensor included in the sensor module.

7. The method of claim 6, wherein the detection of the approach of the object includes detecting a displacement profile of the object, wherein the displacement profile comprises the approach of the object and the detected information, and the closing element is only actuated in response to the displacement profile meeting the at least one condition.

8. The method of claim 6, wherein the activation of the further sensor comprises generation of a visual marker for localizing the position.

9. The method of claim 6, wherein the detection of the approach comprises activation and analysis of different pixels of the optical sensor successively against time.

10. The method of claim 9, wherein the pixels are disposed in a matrix, left columns of the matrix corresponding to a left side region of a detection region, right columns of the matrix corresponding to a right side region of the detection region, wherein the detection region defines a region in which an object is detected by the optical sensor,
wherein pixels of the right column are activated and analyzed successively against time, wherein such activation and analysis are commenced with the pixels of the column lying furthest to the right and then proceeding in the direction of the middle column of the matrix with columns lying further in the middle, and/or
pixels of the left columns are activated and analyzed successively against time, wherein such activation and analysis are commenced with the pixels of the column lying furthest to the left and then proceeding in the direction of the middle column of the matrix with columns lying further in the middle.

11. The method of claim 10, wherein the pixels of the right columns and the pixels of the left columns are alternately activated and analyzed so that first all pixels of the right columns are activated and analyzed successively against time and, then all pixels of the left columns are activated and analyzed successively against time.

12. The method of claim 1, wherein a centroid of an area is calculated starting from all pixels in the optical sensor that are currently detecting the object, a displacement of the centroid of the area against time is analyzed, and the approach of the object is detected in response to the centroid of the area moving to the position and dwelling at the position for a predetermined time interval.

13. A device for actuating a closing element of a vehicle, the device comprising:
 a controller;
 a radio antenna; and
 a sensor module including an optical sensor and a further sensor,
 wherein the optical sensor detects an approach of an object to a position in a region wherein the sensor module includes an optical sensor that is only partially activated for the detection of the approach, wherein, in response to the detecting of the object approach, the radio antenna and the controller search for a radio key that is authorized for the vehicle,
 wherein the controller activates the further sensor only in response to the radio key being found,
 wherein the further sensor and the controller detect information, and
 wherein the device actuates the closing element in response to the controller determining that the detected information meets at least one predetermined condition.

14. The device of claim 13, wherein the optical sensor comprises pixels that are disposed in a matrix.

15. The device of claim 13, wherein the detection of the approach of the object towards the position by the optical sensor is performed by the optical sensor detecting a directed displacement of the object towards the optical sensor.

16. The device of claim 13, wherein the detection of the information by the further sensor of the sensor module comprises voice recognition performed using audio amplifier and/or a microphone.

17. The device of claim 13, wherein the detection of the approach comprises detection of the object dwelling at the position in the region for a predetermined time interval.

18. The device of claim 13, wherein the detection of the approach comprises the detection of ambient influences, wherein the ambient influences are taken into account during the subsequent detection of the information by the further sensor of the sensor module.

19. The device of claim 13, wherein the further sensor in the sensor module comprises a further optical sensor, wherein the optical sensor of the sensor module is only partially activated for the detection of the approach, and wherein the activation of the optical sensor of the further sensor is performed in combination with full activation of the optical sensor included in the sensor module.

20. The device of claim 19, wherein the detection of the approach of the object includes detecting a displacement profile of the object, wherein the displacement profile comprises the approach of the object and the detected information, and the closing element is only actuated in response to the displacement profile meeting the at least one condition.

21. The device of claim 19, wherein the activation of the further sensor comprises generation of a visual marker for localizing the position.

22. The device of claim 19, wherein the detection of the approach comprises activation and analysis of different pixels of the optical sensor successively against time.

23. The device of claim 22, wherein the pixels are disposed in a matrix, left columns of the matrix corresponding to a left side region of a detection region, right columns of the matrix corresponding to a right side region of the detection region, wherein the detection region defines a region in which an object is detected by the optical sensor,
 wherein pixels of the right column are activated and analyzed successively against time, wherein such activation and analysis are commenced with the pixels of the column lying furthest to the right and then proceeding in the direction of the middle column of the matrix with columns lying further in the middle, and/or
 pixels of the left columns are activated and analyzed successively against time, wherein such activation and analysis are commenced with the pixels of the column lying furthest to the left and then proceeding in the direction of the middle column of the matrix with columns lying further in the middle.

24. The device of claim 23, wherein the pixels of the right columns and the pixels of the left columns are alternately activated and analyzed so that, first, all pixels of the right columns are activated and analyzed successively against time and, then, all pixels of the left columns are activated and analyzed successively against time.

25. The device of claim 13, wherein a centroid of an area is calculated starting from all pixels in the optical sensor that are currently detecting the object, a displacement of the centroid of the area against time is analyzed, and the approach of the object is detected in response to the centroid of the area moving to the position and dwelling at the position for a predetermined time interval.

* * * * *